(Model.)

B. SPIETH.
HOPPLE.

No. 388,737. Patented Aug. 28, 1888.

Witnesses,
R. F. Train.
C. D. Taylor.

Inventor:
Benjamin Spieth
by Geo. E. Lemon
Atty.

UNITED STATES PATENT OFFICE.

BENJAMIN SPIETH, OF DONIPHAN, NEBRASKA.

HOPPLE.

SPECIFICATION forming part of Letters Patent No. 388,737, dated August 28, 1888.

Application filed April 20, 1888. Serial No. 271,756. (Model.)

*To all whom it may concern:*

Be it known that I, BENJAMIN SPIETH, a citizen of the United States, residing at Doniphan, in the county of Hall and State of Nebraska, have invented a new and useful Improvement in an Anti-Cow-Kicker, of which the following is a specification.

My invention relates to an improved anti-kicking device adapted to be used in connection with cows, the construction and arrangement of the parts thereof being hereinafter fully described, and pointed out in the claims.

The object of my invention is to provide a device of this character to be attached to the legs of a cow to prevent kicking or stepping about while being milked or otherwise handled. I attain this object by the construction illustrated in the accompanying drawings, wherein like letters of reference indicate similar parts in the several views, and in which—

Figure 1:
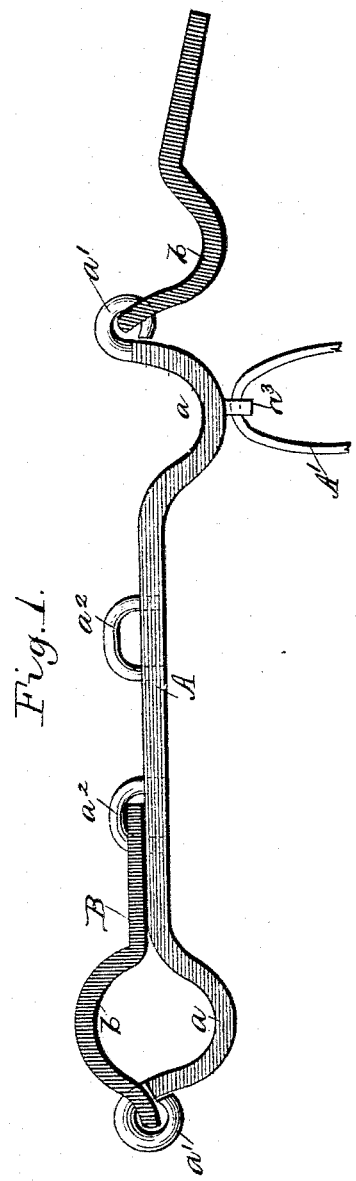
Figure 2:
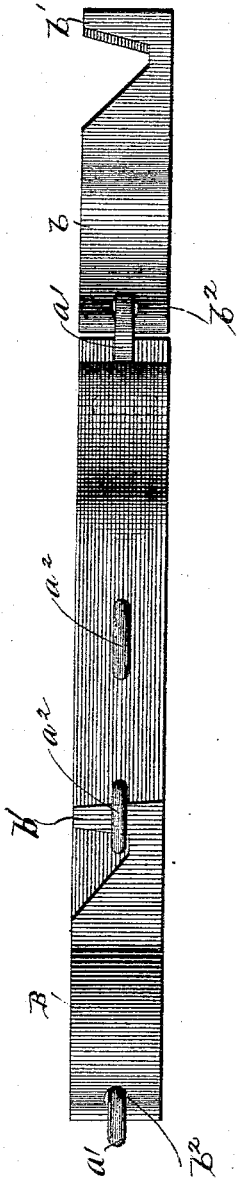

Figure 1 is a top plan view of my improvement with one of the securing-hasps thrown open. Fig. 2 is a view in side elevation.

A indicates a long iron bar with depressions or bends $a$, to form loops which fit around one of the fore and hind legs of the animal. The ends of said bar A are provided with eyes $a'$, and from one side thereof staples $a^2$ project outwardly. Two hasps, B, are provided and constructed with apertures $b^2$, for engagement with the eyes $a'$ on the ends of the bar A. This connection of the hasps with the bar A allows a vertical and horizontal swinging hinged movement. The said hasps B are also bent or depressed, as at $b$, in a reverse direction to the bends $a$ in the bar A. The free ends of the hasps B are constructed with hooks $b'$, which are adapted to engage the staples $a^2$. To the outer surface of one of the bends $a$ a staple, $a^3$, is secured, to which a link, A′, is attached. A strap is adapted to be attached to this link and be passed around the hind leg of the animal not engaged by the bar A.

In applying my improved device the loops or bends $a$ of the bar A are adjusted against one fore and one hind leg of the animal. The hasps B are then closed around legs, and the hooks $b'$ thereof attached to the staples $a^2$, when the device will be firmly locked in connection with the legs of the animal.

Having thus described my invention, what I claim as new, and desire to secure by Letters Patent, is—

1. In an anti-kicking device, the combination, with the main bar, having bends, end eyes, and staples, of the end hasps attached to the eyes of the main bar and having bends and hooked ends adapted to engage the staples of the said bar, substantially as described.

2. In an anti-kicking device, the combination, with the main bar, having bends, end eyes, and staples, of the end hasps attached to the eyes of the main bar and having bends and hooked ends adapted to engage the staples of the said bar, and the link also attached to one side of the bar, substantially as described.

BENJAMIN SPIETH.

Witnesses:
   W. W. DUNGAN,
   C. D. TAYLOR.